(12) United States Patent
Singh et al.

(10) Patent No.: US 12,328,586 B2
(45) Date of Patent: *Jun. 10, 2025

(54) METHODS AND SYSTEMS FOR SMART IDENTIFICATION AND STEP-UP AUTHENTICATION

(71) Applicant: Mastercard International Incorporated, Purchase, NY (US)

(72) Inventors: Sachin Kumar Singh, Pune (IN); Kaushal Shetty, O'Fallon, MO (US); Venkata Satya Sivajee Pinnamaneni, Dardenne Prairie, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,086

(22) Filed: Mar. 5, 2024

(65) Prior Publication Data

US 2024/0214821 A1 Jun. 27, 2024

Related U.S. Application Data

(63) Continuation of application No. 17/566,814, filed on Dec. 31, 2021, now Pat. No. 11,924,646.

(51) Int. Cl.
*H04W 12/67* (2021.01)
*G06Q 20/32* (2012.01)

(52) U.S. Cl.
CPC .......... *H04W 12/67* (2021.01); *G06Q 20/325* (2013.01)

(58) Field of Classification Search
CPC ... H04W 12/67; H04W 12/06; H04W 12/122; G06Q 20/325; G06Q 20/206;
(Continued)

(56) References Cited

U.S. PATENT DOCUMENTS

| 2008/0043686 | A1* | 2/2008 | Sperti | H04L 63/1408 |
| | | | | 370/338 |
| 2013/0036058 | A1* | 2/2013 | Kelly | G06Q 20/3823 |
| | | | | 705/67 |

(Continued)

OTHER PUBLICATIONS

Liang et al., "The Practical Risk Assessment for Enterprise Wireless Local Area Network", Apr. 2014, International Conference on Information Science, Electronics and Electrical Engineering, pp. 1936-1940 (Year: 2014).*

*Primary Examiner* — Kenneth W Chang
(74) *Attorney, Agent, or Firm* — Hovey Williams LLP

(57) ABSTRACT

The disclosure describes systems and techniques for assessing risk of an open Wi-Fi network, at a consumer's request, before the consumer performs a transaction. The system receives a Wi-Fi network risk assessment request associated with a Wi-Fi network connection of a mobile device. Upon receiving the request, the system retrieves connection-related data from the mobile device. The connection-related data is associated with the Wi-Fi network connection. The system performs a Wi-Fi risk assessment of the Wi-Fi network connection. The system transmits a result of the risk assessment to the mobile device for presentation on the mobile device. The system also transmits the result of the risk assessment to an issuer server. The issuer server is associated with a payment account of the consumer. Moreover, the system transmits a step-up authentication alert to the issuer server.

17 Claims, 8 Drawing Sheets

(58) Field of Classification Search
CPC ........... G06Q 20/3224; G06Q 20/4015; G06Q 20/4016; G06Q 20/409
See application file for complete search history.

(56) References Cited

U.S. PATENT DOCUMENTS

| | | | | |
|---|---|---|---|---|
| 2013/0144785 | A1* | 6/2013 | Karpenko | G06Q 20/425 |
| | | | | 705/44 |
| 2014/0040139 | A1* | 2/2014 | Brudnicki | G06Q 20/3224 |
| | | | | 705/44 |
| 2017/0193516 | A1* | 7/2017 | Wiesman | G06Q 20/405 |
| 2020/0005295 | A1* | 1/2020 | Murphy | G06Q 20/405 |
| 2020/0344257 | A1* | 10/2020 | Basavapatna | H04L 63/1416 |

* cited by examiner

METHODS AND SYSTEMS FOR SMART IDENTIFICATION AND STEP-UP AUTHENTICATION

CROSS-REFERENCE TO RELATED APPLICATIONS

This application is a continuation application of identically titled U.S. patent application Ser. No. 17/566,814 filed Dec. 31, 2021, which is incorporated herein by reference in its entirety.

FIELD OF THE DISCLOSURE

The field of the disclosure relates generally to mobile device security, and, more particularly, to assessing a risk of a Wi-Fi network providing a network connection to a mobile device.

BACKGROUND OF THE DISCLOSURE

Consumers increasingly use their mobile device to perform electronic payment transactions. In some instances, cellular connections may not be available due to lack of area coverage or diminished signal strength, for example, when inside some structures. In such instances, consumers may often find themselves looking for public or otherwise open Wi-Fi data connections. Connecting to an open or public network, however, means that the network is typically shared with many unknown users. Such network sharing puts the consumer's data at risk. Furthermore, some open or public networks may be setup by fraudsters to solicit unsuspecting users to connect. This allows the fraudster to eavesdrop on the user's data streams, and/or outright steal the user's data from their mobile device.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system is provided. The system includes a memory device and a processor. The processor is communicatively coupled to the memory device. The memory device includes computer-executable instructions, that when executed by the processor, cause the processor to receive, from a mobile device of a consumer, a Wi-Fi network risk assessment request. The Wi-Fi network risk assessment request is associated with a Wi-Fi network connection of the mobile device. Upon receiving the receiving the Wi-Fi network risk assessment request, the processor retrieves a plurality of connection-related data from the mobile device. The connection-related data is associated with the Wi-Fi network connection. The processor performs a Wi-Fi risk assessment of the Wi-Fi network connection based on the connection-related data. The processor transmits a result of the Wi-Fi risk assessment to the mobile device for presentation via a user interface of the mobile device. Furthermore, the processor transmits the result of the Wi-Fi risk assessment to an issuer server. The issuer server is associated with a payment account of the consumer. Moreover, based on the result exceeding a predetermined threshold value, the processor transmits a step-up authentication alert to the issuer server.

In another aspect, a method is provided. The method includes receiving, from a mobile device of a consumer, a Wi-Fi network risk assessment request. The Wi-Fi network risk assessment request is associated with a Wi-Fi network connection of the mobile device. Upon receiving the receiving the Wi-Fi network risk assessment request, the method includes retrieving a plurality of connection-related data from the mobile device. The connection-related data is associated with the Wi-Fi network connection. Furthermore, the method includes performing a Wi-Fi risk assessment of the Wi-Fi network connection based on the connection-related data. In addition, the method includes transmitting a result of the Wi-Fi risk assessment to the mobile device for presentation via a user interface of the mobile device, and transmitting the result of the Wi-Fi risk assessment to an issuer server. The issuer server is associated with a payment account of the consumer. Moreover, the method includes, based on the result exceeding a predetermined threshold value, transmitting a step-up authentication alert to the issuer server.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
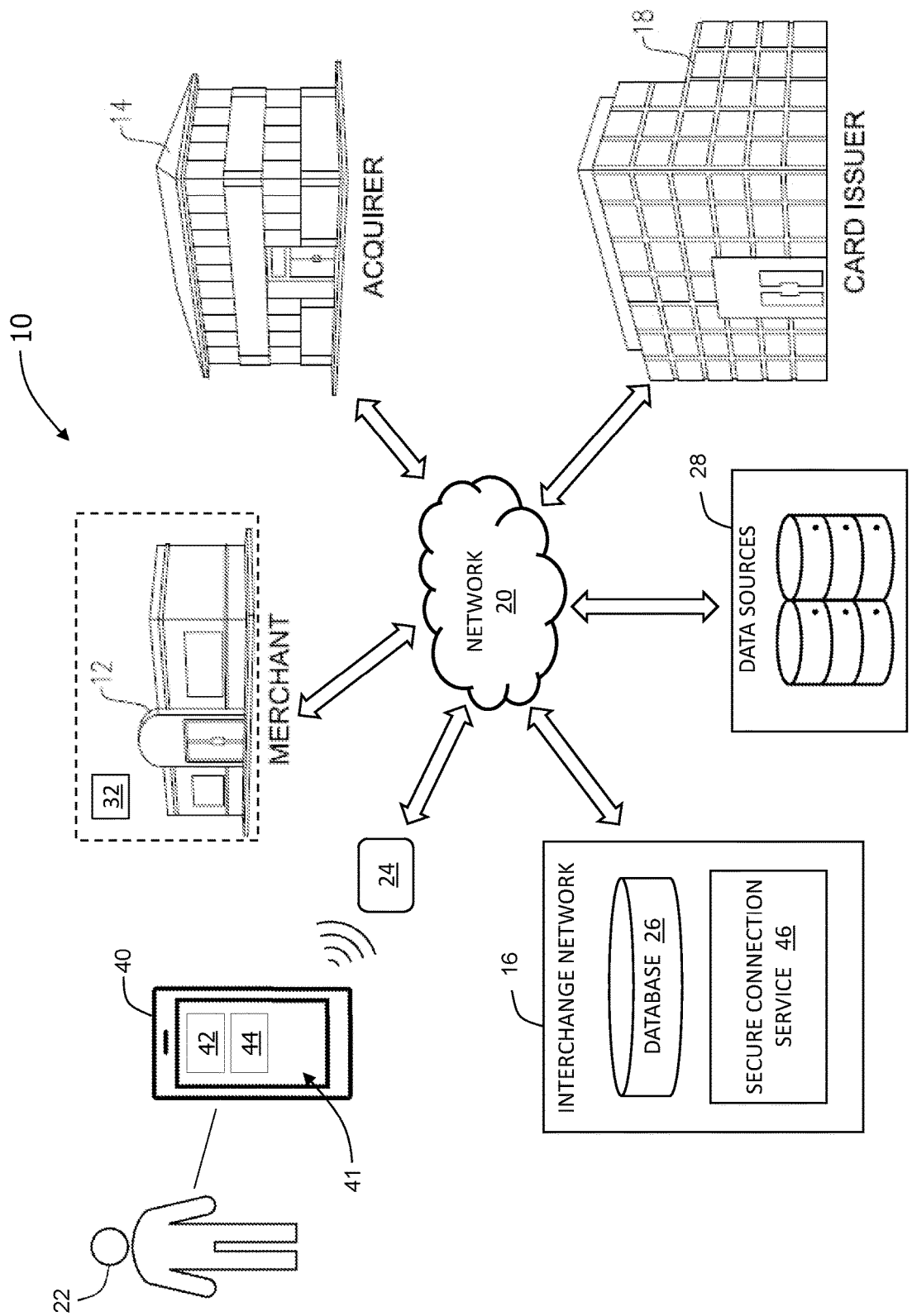
FIG. 1 is a block diagram of an example multi-party payment network system, in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

As used herein, the terms "payment card," "transaction card," and "financial transaction card," includes any suitable transaction card, such as a credit card, a debit card, a charge card, a membership card, a promotional card, an identification card, a prepaid card, a gift card, and/or any other card-type device that may hold payment account information. Each type of transaction card can be used as a method of payment for performing a transaction.

The terms "user" or "consumer," as used herein, include an entity (such as an individual or a company) that interacts with a "user device" (such as a mobile device) to conduct transactions in accordance with the present invention. As used herein, the terms "digital wallet" or "wallet application" includes an application installed on a "mobile device" that allows a user to conduct payment transactions in accordance with the present invention. Each digital wallet or wallet application may store information associated with one or more payment cards associated with the user or consumer.

As used herein, a "mobile device" includes a portable device that can be transported and operated by a user or consumer, and includes one or more electronic components (e.g., a processor, a communications device, etc.). A mobile device may be in any suitable form including, for example, a mobile phone (e.g., a smart phone, cellular phone, etc.), a tablet computer, a portable media player, a personal digital assistant device (PDA), a wearable communication device (e.g., watch, bracelet, glasses, etc.), an electronic reader device, a portable computer (e.g., a laptop, a netbook, an ultrabook, etc.), etc. In certain aspects of the present invention, a mobile device may also be in the form of a vehicle (e.g., a car) equipped with wireless communication capabilities.

Furthermore, as used herein, the term "real-time" includes at least one of the times of occurrence of the associated events, the time of collection of data, the time to process the data, and the time of a system response to the events and the environment. For the activities and the events in the embodiments described herein as occurring in real-time, it should be assumed that they occur substantially instantaneously.

Payment Network Systems

FIG. 1 is a block diagram of an example multi-party payment network system 10. The payment network system 10 facilitates providing interchange network services offered by an interchange network 16, such as a secure Wi-Fi connection service that facilitates a secure environment to perform wireless transactions, for example, over an open Wi-Fi connection. The transactions may be initiated, for example, by a consumer 22 via his or her mobile device 40. In addition, the payment network system 10 enables payment transactions in which merchants 12, acquirers 14, and/or issuers 18 do not need to have a one-to-one relationship. Although parts of the payment network system 10 are presented in one arrangement, other embodiments may include the same or different parts arranged otherwise, depending, for example, on authorization processes for purchase transactions, communication between computing devices, etc. As used herein, the term "interchange network" includes an electronic network that exchanges data relating to the value of card account sales and credits among the issuers 18 and the acquirers 14 (e.g., networks maintained, for example, by Mastercard®). (Mastercard is a registered trademark of Mastercard International Incorporated.)

In the exemplary embodiment, the mobile device 40 includes a user interface 41 that facilitates user interaction with the respective mobile device 40. For example, and without limitation, the user interface 41 enables the consumer 22 to input information (e.g., via touch, type, and/or voice commands) to the mobile device 40, and the mobile device 40 to output information to the consumer 22 (e.g., via audio and/or display signals). The mobile device 40 includes, for example, a digital wallet application 42 (broadly, a digital wallet), which is linked to a digital wallet service and/or installed on the mobile device 40. It is contemplated that more than one digital wallet may be associated with the mobile device 40 and accessible by the user interface 41, where each digital wallet is associated with at least one financial institution (such as the issuer 18).

The mobile device 40 can be any computing device capable of interconnecting to the network 20, such as the Internet, including a smartphone, PDA, or other web-based connectable equipment. The mobile device 40 is preferably interconnected to the Internet (e.g., network 20) through one or more interfaces including an open wireless network, such as a wireless modem/router 24. In addition, in the example embodiment, the mobile device 40 is configured to communicate with other user computing devices and/or merchant point-of-sale (POS) systems 32 using various forms of communication including, for example, radio frequency communication, near field communication (NFC), network-based communication, and the like.

In the example embodiment, the payment network system 10 generally includes the merchants 12, the acquirers 14, the interchange network 16, and the issuers 18 coupled in communication via a network 20. The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, and/or the issuers 18. In some embodiments, the network 20 may include more than one type of network, such as a private payment transaction network provided by the interchange network 16 to the acquirers 14 and/or the issuers 18, and, separately, the public Internet, which may facilitate communication between the merchants 12, the interchange network 16, the acquirers 14, and consumers 22, etc.

Embodiments described herein may relate to a transaction card system, such as a credit card payment system using the Mastercard interchange network. The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a payment card issued by an issuer, purchase data representing a purchase made by the consumer, including a type of merchant, amount of purchase, date of purchase, and other data, which may be transmitted between any parties of multi-party payment network system 10.

In a transaction card system as described herein, a financial institution called the "issuer" issues a payment card account (not shown) to a cardholder or consumer 22, who uses the payment card account to tender payment for a purchase from the merchant 12. In the example embodiment, the merchant 12 is typically associated with products, for example, and without limitation, goods and/or services, which are offered for sale and are sold to the consumers 22. The merchant 12 includes, for example, a physical location and/or a virtual location. A physical location includes, for example, a brick-and-mortar store, etc., and a virtual location includes, for example, an Internet-based storefront.

To accept payment with the payment card account, the merchant 12 must normally establish an account with a financial institution that is part of the payment network system 10. This financial institution is usually called the "merchant bank," the "acquiring bank," or the acquirer 14. When the consumer 22 provides payment for a purchase with the payment card account (e.g., via a payment card or digital wallet), the merchant 12 requests authorization from the acquirer 14 for the purchase amount. The request may be performed over the network 20, for example, using a point-of-sale (POS) terminal, such as the POS terminal 32, that wirelessly connects to the mobile device 40 and reads the consumer's payment account information, such as a payment token 44 (broadly, digital wallet data) tied to a primary account number (PAN), from a memory device of the mobile device 40 and communicates electronically with the transaction processing computers of the acquirer 14. Alternatively, the acquirer 14 may authorize a third party to perform transaction processing on its behalf. In this case, the POS terminal 32 will be configured to communicate with the third party. Such a third party is usually called a "merchant processor," an "acquiring processor," or a "third party processor."

Using the interchange network 16, computers of the acquirer 14 or merchant processor will communicate with computers of the issuer 18 to determine whether the consumer's account is in good standing and whether the purchase is covered by the consumer's available credit line. Based on these determinations, the request for authorization will be declined or accepted. If the request is accepted, an authorization code is issued to the merchant 12.

When a request for authorization is accepted, the available credit line of the consumer's account is decreased. Normally, a charge for a payment card transaction is not posted immediately to the consumer's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the POS terminal 32. This may include bundling of approved transactions daily for standard retail purchases. If the consumer 22 cancels a transaction before it is captured, a "void" is generated. If the consumer 22 returns goods after the transaction has been captured, a "credit" is generated. The interchange network 16 and/or the issuer 18 stores the transaction data, such as, and without limitation, the PAN, a type of merchant, a merchant identifier, a location where the transaction was completed, an amount of purchase, a merchant category code, a date and time of the transaction, products purchased and related descriptions or identifiers, etc., in a transaction database 26.

After a purchase has been made, a clearing process occurs to transfer additional transaction data related to the purchase among the parties to the transaction, such as the acquirer 14, the interchange network 16, and the issuer 18. More specifically, during and/or after the clearing process, additional data, such as a time of purchase, a merchant name, a type of merchant, purchase information, consumer account information, a type of transaction, itinerary information, information regarding the purchased item and/or service, and/or other suitable information, is associated with a transaction and transmitted between the parties to the transaction as transaction data, and may be stored by any of the parties to the transaction.

After a transaction is authorized and cleared, the transaction is settled among the merchant 12, the acquirer 14, and the issuer 18. Settlement refers to the transfer of financial data or funds among the merchant 12, the acquirer 14, and the issuer 18 related to the transaction. Usually, transactions are captured and accumulated into a "batch," which is settled as a group. More specifically, a transaction is typically settled between the issuer 18 and the interchange network 16, and then between the interchange network 16 and the acquirer 14, and then between the acquirer 14 and the merchant 12. It should be appreciated that more or less information related to transactions, as part of either authorization, clearing, and/or settlement, may be included in the transaction data and stored within the transaction database 26, at the merchant 12, the acquirer 14, the payment network 16, and/or the issuer 18. Further, transaction data, unrelated to a particular payment account, may be collected by a variety of techniques, and similarly stored within the transaction database 26.

In some embodiments, consumers 22 involved in the transactions described herein are prompted to agree to legal terms associated with their payment accounts, for example, during enrollment in such payment accounts, etc. As such, the consumer 22 may voluntarily agree to allow the merchants 12, the issuers 18, the interchange network 16, etc., to utilize data collected during enrollment and/or collected relating to processing the transactions, subsequently for one or more of the purposes described herein.

As described above, the payment token 44 and/or the consumer's PAN is passed from the mobile device 40 to the merchant 12, for example, via the network 20 and/or the POS terminal 32. In many instances, the payment token 44 and/or the PAN and the associated expiry date may be saved to various databases, such as the database 26. Digital wallet transactions initiated by the mobile device 40 via the network 20 and/or at the POS terminal 32 typically include tokenized account data (such data including, for example, the PAN and the expiry date). As a result, the possibility of the actual PAN and expiry date of a payment card account to be exposed to fraudsters, for example, via a data breach, is substantially decreased. However, in some instances, fraudsters may intercept transaction data, for example, via the wireless modem/router 24.

Thus, referring back to FIG. 1, the interchange network 16 includes a secure connection service 46 (e.g., a computing system) that is configured to analyze various connection-related data associated with the wireless connection between the mobile device 40 and the wireless modem/router 24, such as Wi-Fi and location data, to assess the risk of the wireless connection before performing a transaction. In particular, in the example embodiment, the secure connection service 46 is a specially programmed computer system that enables the interchange network 16 to implement an automated process to assess the wireless network risk, provide the risk assessment to the consumer 22, and provide a connection risk score and step-up authentication alert to an issuer before the transaction is initiated.

In the example embodiment, the secure connection service 46 is programmed to communicate with one or more consumer devices, such as the mobile device 40, to receive account registration information (not shown in FIG. 1) to facilitate establishing an account that is not already registered with the secure connection service 46. In particular, the account registration process creates a consumer account and associated transaction credentials for use with the secure connection service 46 and/or the digital wallet application 42. The consumer 22 enters the account registration information for transmission to the secure connection service 46. The account registration information may include, for example, and without limitation, payment account data (e.g., the PAN, a virtual payment number, limited use number, etc.) and identification data of the mobile device 40 (e.g., an Electronic Serial Number (ESN) and the like) of the consumer 22, as described herein. Furthermore, the account registration information may include consumer consent for the sharing of various data (e.g., social media service logs via the mobile device 40 and/or one or more data sources 28 (which can include the transaction database 26)) and location data by the mobile device 40. There is preferably no sharing of data from the mobile device 40 without the consumer's consent. Account configuration and consumer opt-in may be carried out via the virtual device authentication computing system 46. The account registration information may be stored in a database, such as the transaction database 26. The secure connection service 46 generates a consumer account from the account registration information for the consumer 22.

In the example embodiment, to assess a wireless network risk, provide the risk assessment to the consumer 22, and provide a connection risk score and step-up authentication alert to an issuer before a transaction is initiated, the secure connection service 46 is programmed to receive various connection-related data parameters. For example, the secure connection service 46 may receive a plurality of Wi-Fi parameters from the wireless network connection (e.g., from the connected wireless modem/router 24), Wi-Fi parameters from other available (e.g., in range) Wi-Fi networks, security status of connected websites or applications, and/or historical network traffic data across the wireless network connection from social media service logs provided, for example, by the data sources 28. Each of the connection-related data are used to determine a connection risk score. The connection risk score is compared to a predetermined threshold value and/or one or more rules to determine whether to alert the consumer 22 and issuer 18 to cancel the transaction or perform the transaction by using a step-up authentication process.

While only one merchant 12, acquirer 14, interchange network 16, and issuer 18 are shown in FIG. 1 (for ease of reference), it should be appreciated that a variety of other embodiments may include multiple ones of these parties in various combinations.

Figure 2:
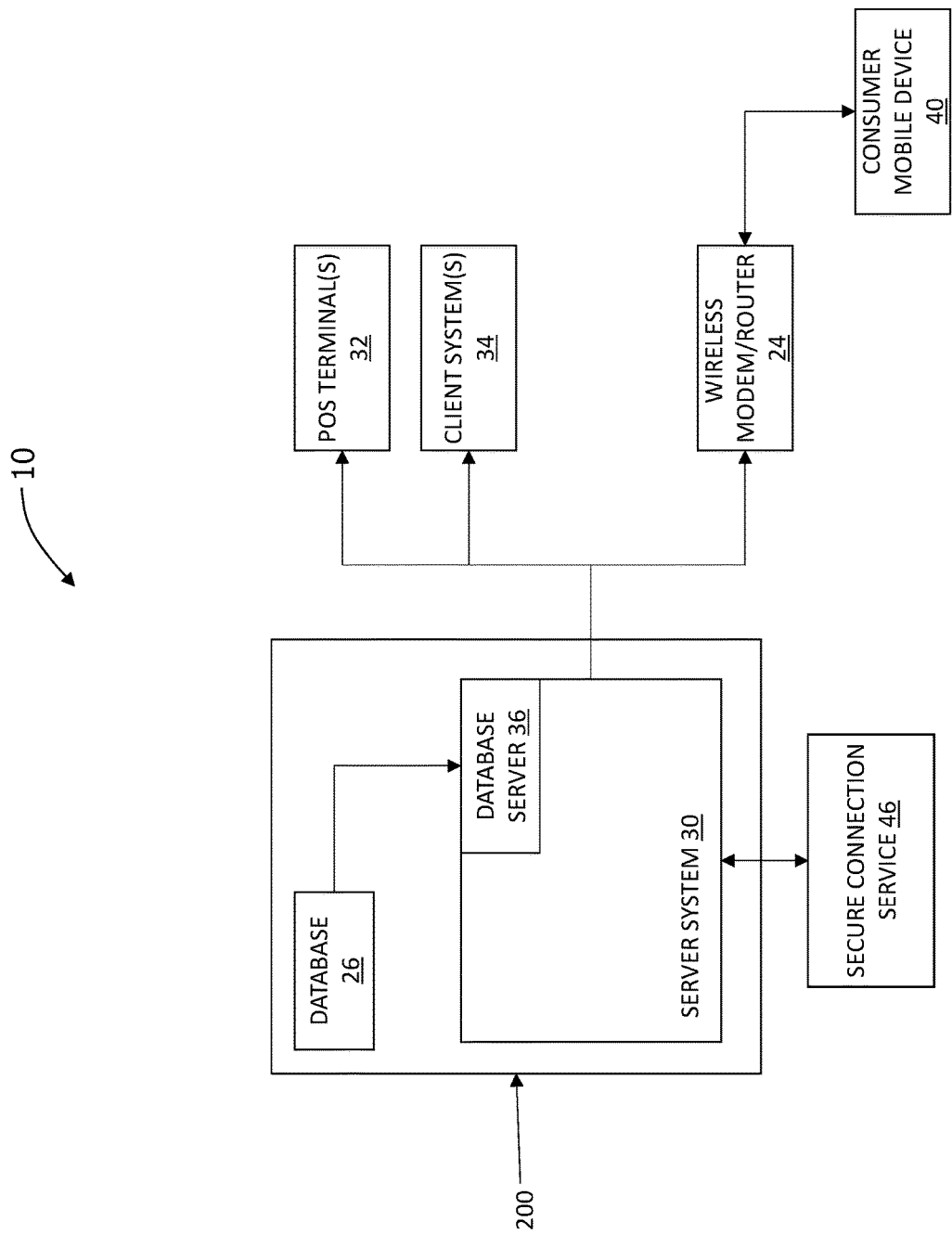
FIG. 2 is a simplified block diagram of an example payment network system, such as the payment network system shown in FIG. 1, including a plurality of computing devices and a secure connection service.

FIG. 2 is a simplified block diagram of an example payment network system, such as the payment network system 10, including a plurality of computing devices and the secure connection service 46. In the example embodiment, the plurality of computing devices include, for example, a processing system 200, a POS terminal 32, a client system 34, the wireless modem/router 24, and the mobile device 40. The POS terminal 32 is located at a merchant, such as the merchant 12 (shown in FIG. 1). The client system 34 (e.g., contactless ATMs, computers, etc.) is associated with a merchant, merchant bank, payment network, and/or issuer bank (e.g., the issuer 18 (shown in FIG. 1)). The mobile device 40 is associated with the consumer 22 (shown in FIG. 1). In one embodiment, the payment network system 10 implements processes for assessing a wireless network risk, providing the risk assessment to the consumer 22, and providing a connection risk score and step-up authentication alert to an issuer before a transaction is initiated by the consumer 22.

In the exemplary embodiment, the processing system 200 includes a server system 30 associated with, for example, the interchange network 16 (shown in FIG. 1). The server system 30 is coupled in communication with the POS terminal 32, the client system 34 (also includes client sub-systems), the wireless modem/router 24, and the mobile device 40 (e.g., via the wireless modem/router 24). In one embodiment, the client system 34 and the mobile device 40 are computing devices that include a web browser, such that the server system 30 is accessible to the client system 34 and the mobile device 40 using the Internet. The client system 34 is interconnected to the Internet through any one or more of many interfaces including, for example, a Wi-Fi network, such as a LAN or WAN, Wi-Fi modems or routers, and/or special high-speed Integrated Services Digital Network (ISDN) lines. In the example embodiment, the mobile device 40 is interconnected to the Internet through the wireless modem/router 24, which may be an open network. In some embodiments, the client system 34 and the mobile device 40 can each be any device capable of interconnecting to the Internet, including an Internet connected phone, a PDA, or any other suitable web-based connectable equipment.

The POS terminal 32 may be connected to the client system 34 or may be connected to the server system 30. The POS terminal 32 may be interconnected to the Internet (or any other network that allows the POS terminal 32 to communicate as described herein) through any one or more of many possible interfaces including a network, such as a local area network (LAN) or a wide area network (WAN), dial-in-connections, cable modems, wireless modems, and special high-speed ISDN lines. The POS terminal 32 is any device capable of interconnecting to the Internet and including an input device capable of reading information from a consumer's financial payment card. In some embodiments, the POS terminal 32 may be a consumer's computing device (e.g., the mobile device 40), such as when conducting an online purchase through the Internet. As used herein, the terms POS device, POS terminal, and point of interaction device are used broadly, generally, and interchangeably to refer to any device with which the consumer 22 interacts to complete a digital wallet transaction.

A database server 36 is connected to the transaction database 26. The database 36 is configured to store information on a variety of matters, including, for example, voice data, location data, consumer profiles/accounts, consumer consents data, tokenization data corresponding to the consumer 22, identification data associated with the mobile device 40, and the like, as is described herein in greater detail. In one embodiment, the transaction database 26 is a centralized database stored on the server system 30. The transaction database 26 may be accessed by potential users at the client system 34 by logging onto the server system 30 through the client system 34. In an alternative embodiment, the transaction database 26 is stored remotely from the server system 30 and may be a distributed or non-centralized database.

In one example embodiment, the transaction database 26 may include a single database having separated sections or partitions or may include multiple databases, each being separate from each other. The transaction database 26 may store transaction data generated as part of sales activities conducted over the processing network, including data relating to merchants, account holders or customers, issuers, acquirers, savings amounts, savings account information, and/or purchases made. The transaction database 26 may also store account data including at least one of a consumer name, a consumer address, an account number, and other account identifiers that relate the mobile device 40 to the consumer 22. The transaction database 26 may also store merchant data including a merchant identifier that identifies each merchant registered to use the network. The merchant data may also include instructions for authenticating consumers and performing and settling transactions, including merchant bank account information. The transaction database 26 may also store Wi-Fi network data, such as, service set identifiers (SSIDs), network frequency data, network channel data, network security data, media access control (MAC) address data, social media service logs, location data, various identifiers, etc.

In the exemplary embodiment, the client system 34 may be associated with the acquirer 14 (shown in FIG. 1) while another client system 34 may be associated with the issuer 18 (shown in FIG. 1). The POS terminal 32 may be associated with the merchant 12 (shown in FIG. 1) or may be a computer system used by the consumer 22 (shown in FIG. 1) when making an on-line purchase or payment. The server system 30 may be associated with the interchange network 16 or another payment processor. In the example embodiment, the server system 30 is associated with a financial transaction processing network, such as the interchange network 16, and may be referred to as an interchange computer system. The server system 30 may be used for processing transaction data. In addition, the client systems 34 and the POS terminal 32 may include a computer system associated with at least one of a merchant, an online bank, a bill payment outsourcer, an acquirer bank, an acquirer processor, an issuer bank associated with a payment card, an issuer processor, a remote payment processing system, a third-party aggregator, and/or a biller.

In the example embodiment, the processing system 200 is in communication with the secure connection service 46. The secure connection service 46 may be associated with the interchange network 16 or with an outside third party in a contractual relationship with the interchange network 16. In some embodiments, the secure connection service 46 is in communication with the server system 30 and may be a component of the server system 30 or a separate computing device. In the example embodiment, the secure connection service 46 assesses a wireless network risk, provides the risk assessment to the consumer 22, and provides a connection risk score and step-up authentication alert to an issuer before a transaction is initiated by the consumer 22. As such, the secure connection service 46 is configured to receive/provide various data from/to one or more parties involved in the potential transaction request. It is noted that the payment network 10 may include more, fewer, or alternative components and/or perform more, fewer, or alternative actions, including those discussed elsewhere herein.

Exemplary Computer Systems

Figure 3:
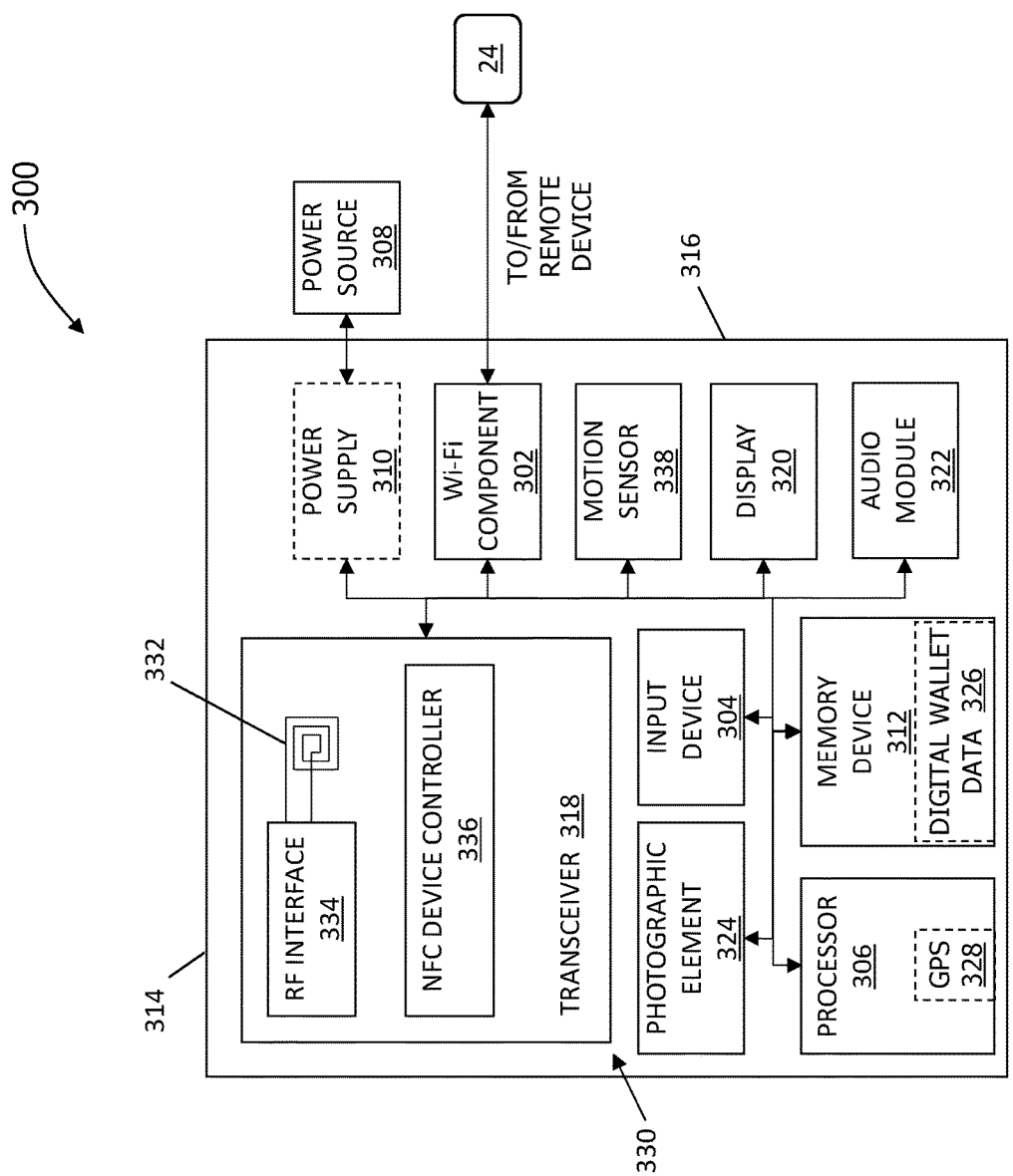
FIG. 3 is an example configuration of a user computing system for use in the payment network system shown in FIG. 1.

FIG. 3 is an example configuration of a user computing system 300, such as the mobile device 40 (shown in FIG. 1), that may be operated by a user, such as the consumer 22 (shown in FIG. 1). In the exemplary embodiment, the computing system 300 is a computing device configured to connect to the wireless modem/router 24. Via the Wi-Fi connection provided by the wireless modem/router 24, the mobile device 40 may connect to one or more of the merchant 12, the interchange network 16, the issuer 18, the network 20, a POS terminal 32, and any other computing devices, such as other consumer computing devices (not shown).

In the exemplary embodiment, the computing system 300 generally includes a processor 306, a memory device 312, a transceiver 318 (or a wireless communication device), and a photographic element 324. In addition, the computing system 300 includes an integrated Wi-Fi component 302 (e.g., implementing the Institute of Electrical and Electronics/IEEE 802.11 family of standards), an input device 304, a display 320, and an audio module 322. Moreover, the computing system 300 optionally includes an internal power supply 310 (e.g., a battery or other self-contained power source) to receive power, or alternatively, in some embodiments, the computing system 300 may include an external power source 308. Optionally, the computing system 300 may include a motion sensor 338.

The processor 306 includes one or more processing units (e.g., in a multi-core configuration) specially programmed for executing computer readable instructions. The instructions may be executed within a variety of different operating systems (OS) on the mobile device 40, such as UNIX, LINUX, Microsoft Windows®, etc. More specifically, the instructions may cause various data manipulations on data stored in the memory device 312 (e.g., create, read, write, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 312 is any device allowing information such as digital wallet data 326, the executable instructions, and/or written works to be stored and retrieved. The memory device 312 includes one or more computer readable media.

In the example embodiment, the processor 306 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 300 may be widely deployed, it may be impractical to manually update software for each computing system 300. Therefore, the network system 10 provides a mechanism for automatically updating the software on the computing system 300. For example, an updating mechanism may be used to automatically update any number of components and their drivers, both network and non-network components, including system level (OS) software components. In some embodiments, the computing system 300 components are dynamically loadable and unloadable; thus, they may be replaced in operation without having to reboot the OS.

A location of the computing system 300 can be obtained through conventional methods, such as a location service (e.g., global positioning system (GPS) service) in the computing system 300, "ping" data that includes geotemporal data, from cell location register information held by a telecommunications provider to which the computing system 300 is connected, and the like. For example, in one suitable embodiment, an optional GPS chip 328 can be part of or separate from the processor 306 to enable the location of the computing system 300 to be determined.

The Wi-Fi component 302 (broadly, a communication interface) may be communicatively connectable to a remote device such as the wireless modem/router 24 (broadly, a wireless access point), the network 20 (shown in FIG. 1), and/or the server system 30 (shown in FIG. 2). The Wi-Fi component 302 may include, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 312 are, for example, computer readable instructions for providing a user interface, such as the user interface 41 (shown in FIG. 1), to the user, such as the consumer 22, via the display 320 and, optionally, receiving and processing input from the input device 304. A user interface may include, among other possibilities, a web browser and a client application. Web browsers enable users, such as the consumer 22, to display and interact with media and other information typically embedded on a web page or a website. A client application allows the consumer 22 to interact with a server application, for example, associated with a merchant.

The photographic element 324 may include a camera or other optical sensor and lens combination capable of generating a video signal and capturing an image, iris scan, and the like. In various embodiments, the photographic element 324 may be integrated in a housing or body, such as a housing 314, of the computing system 300. When the photographic element 324 captures an image or otherwise generates image data (e.g., video data), the photographic element 324 may store the image data in a data file, either in a raw or compressed format, in the memory device 312.

In some embodiments, the motion sensor 338 may include one or more sensor elements that facilitate detecting a person's presence. For example, if the computing system 300 is operating as a mobile device 40, the motion sensor 338 detects when the consumer 22 moves or raises the consumer device. Upon detection of such motion, the photographic element 324 may begin capturing images (e.g., still or video images), the transceiver 318 may be activated, and/or the audio module 322 may begin capturing audio. The motion sensor 338 may be operatively coupled to the photographic element 324 such that the consumer's presence may be detected by detecting motion using the photographic element 324. The motion sensor 338 may include, for example, and without limitation, sensor elements such as a passive infrared sensor, an ambient light sensor, and the like.

In the example embodiment, the display 320 can include, for example, and without limitation, a liquid crystal display (LCD), an organic light emitting diode (OLED) display, or an "electronic ink" display. In some embodiments, a single component such as a touch screen may function as both an output device (e.g., the display 320) and the input device 304. As such, the display 320 may optionally include a touch controller for support of touch capability. In such embodiments, the computing system 300 may detect a user's presence by detecting that the user has touched the display 320 of the computing system 300.

The audio module 322 may include, for example, and without limitation, a speaker and related components capable of broadcasting streaming and/or recorded audio and may also include a microphone. The microphone facilitates capturing audio through the computing system 300.

In the example embodiment, the computing system 300 includes the housing 314 at least partly (and more preferably, at least substantially or entirely) enclosing the components described above. In addition, the computing system 300 includes circuitry 330 configured to communicate with the network 20 (shown in FIG. 1) and/or other computing devices (e.g., other mobile devices, the POS terminal 32, the interchange network 16, etc.). The circuitry 330 may include, for example, leads, connectors, NFC-enabled circuitry, Wi-Fi-enabled circuitry, and photographic element circuitry. The housing 314 is preferably configured to seal the circuitry 330, which is susceptible to degradation from the ambient environment. In one embodiment, the circuitry 330 is hermetically sealed in the housing 314. For example, in one embodiment, the circuitry 330 is completely and permanently encased within the housing 314. In other words, the housing 314 and the circuitry 330 are intended to remain as a single, inseparable unit throughout the life of the computing system 300. It is understood that the housing 314 can be formed separately from the circuitry 330 and that the circuitry 330 can be placed into and sealed within the housing 314 in a separate operation. It is also understood that the housing 314 can be oversized with respect to the circuitry 330 so that the circuitry 330 can be placed loosely into the housing 314. In another embodiment, the circuitry 330 can be selectively, sealingly enclosed within the housing 314, where the housing 314 includes a closure 316 removably attached to a body of the housing 314.

The housing 314 is fabricated from a suitably selected material that facilitates inhibiting the effect the material has on the signal being emitted from, for example, the transceiver 318 and/or the Wi-Fi component 302 and passing through the housing material. For example, and without limitation, suitable materials from which the housing 314 may be fabricated include polyethylene, propylene, isoprene, and butylenes (i.e., polyolefins). In other embodiments, the housing 314 is fabricated from any material that enables the computing system 300 to function as described herein, such as metals, etc.

In one embodiment, the transceiver 318 includes an antenna 332. The antenna 332 includes a looped wire configured to transmit radio signals when current flows through the looped wire. The antenna 332 is any size, shape, and configuration that is suitable for transmitting signals as described herein. For example, the antenna 332 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 332 generates a magnetic field when it vibrates at a selected frequency. Specifically, the antenna 332 is configured to vibrate at a frequency of about 13.56 MHz, which is suitable for use in a near field communication (NFC) system.

In the example embodiment, the antenna 332 transmits radio signals to and receives radio signals from other wireless-enabled computing devices, for example, another mobile device, merchant POS terminal 32, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 332 functions as an NFC component to send and receive signals. The antenna 332 is configured to transmit radio signals to NFC components positioned within the magnetic field of the antenna 332, such as when the mobile device 40 is located within a predetermined distance of the POS terminal 32. Therefore, the magnetic field generated by the antenna 332 defines the active range of the computing system 300. Additionally, the antenna 332 receives radio signals from NFC components when the antenna 332 is positioned within the magnetic field of the NFC components.

The transceiver 318 also includes a radio frequency (RF) interface 334 and an NFC device controller 336. The RF interface 334 and the NFC device controller 336 are powered by the power source 308, and in some embodiments, the internal power supply 310 and/or the display 320. In addition, the processor 306 and the memory device 312 are powered in the same manner. The RF interface 334 is configured to receive and transmit RF signals through the antenna 332. The NFC device controller 336 is configured to process the received RF signals and to generate signals to be transmitted by the RF interface 334. The memory device 312 is configured to store data associated with transmitting and receiving the RF signals. The NFC device controller 336 is coupled in communication with the processor 306.

In some embodiments, the computing system 300 may be connected to one or more peripheral devices (not shown). That is, the computing system 300 may communicate various data with one or more peripheral devices. For example, the computing system 300 may communicate with one or more peripheral devices through the Wi-Fi component 302, the transceiver 318, or other suitable means.

Figure 4:
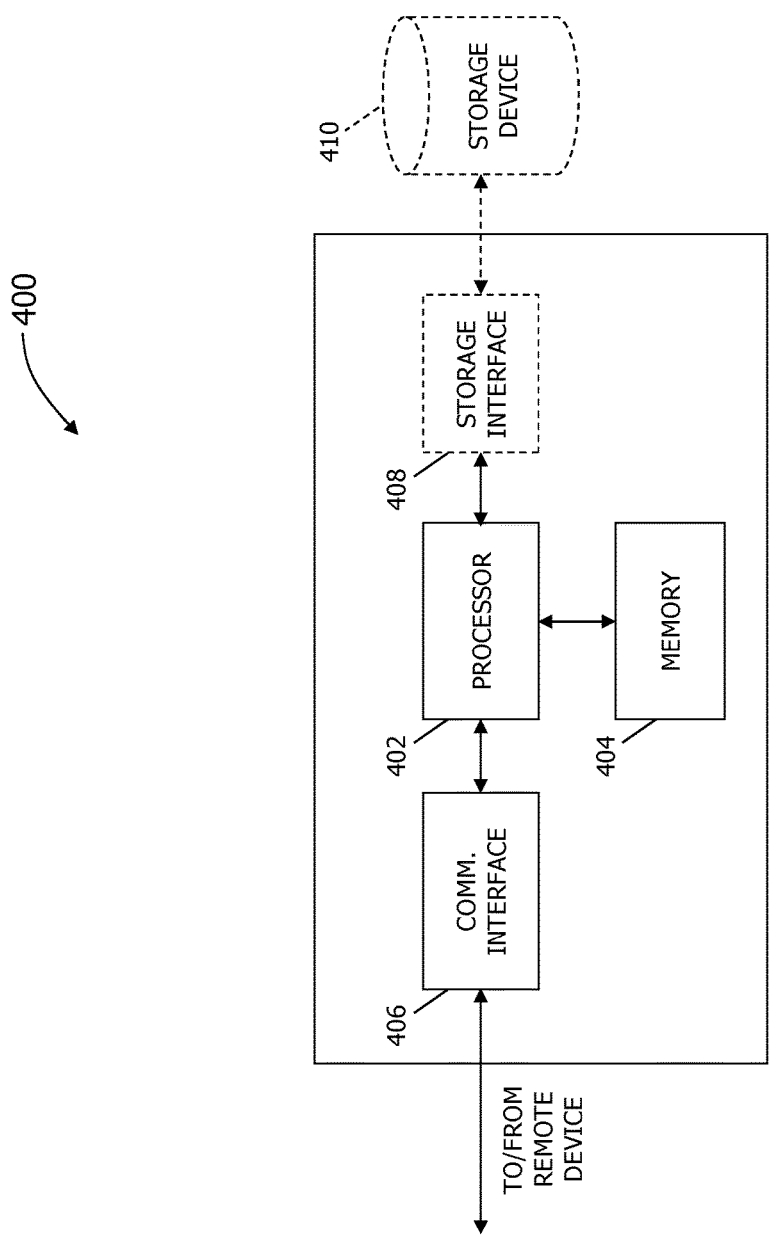
FIG. 4 is an example configuration of a server system for use in the payment network system shown in FIG. 1.

FIG. 4 is an example configuration of a server system 400, such as the server system 30 (shown in FIG. 2). The server system 400 includes, but is not limited to, the transaction database 26 (shown in FIG. 1) and the secure connection service 46 (shown in FIG. 1). In the example embodiment, the server system 400 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C #, C++, Java, or other suitable programming languages, etc.). In the example embodiment, the processor 402 may be implemented as one or more cryptographic processors, as described above with respect to the user system 400.

The processor 402 is operatively coupled to a communication interface 406 such that the server system 400 can communicate, for example, with the network 20 and/or a remote device, such as a user computing system 300 (shown in FIG. 3) and/or another server system. For example, the communication interface 406 may receive communications from a POS terminal 32, a client system 34, and/or a mobile device 40 via the Internet.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is similar to the transaction database 26. For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Figure 5:
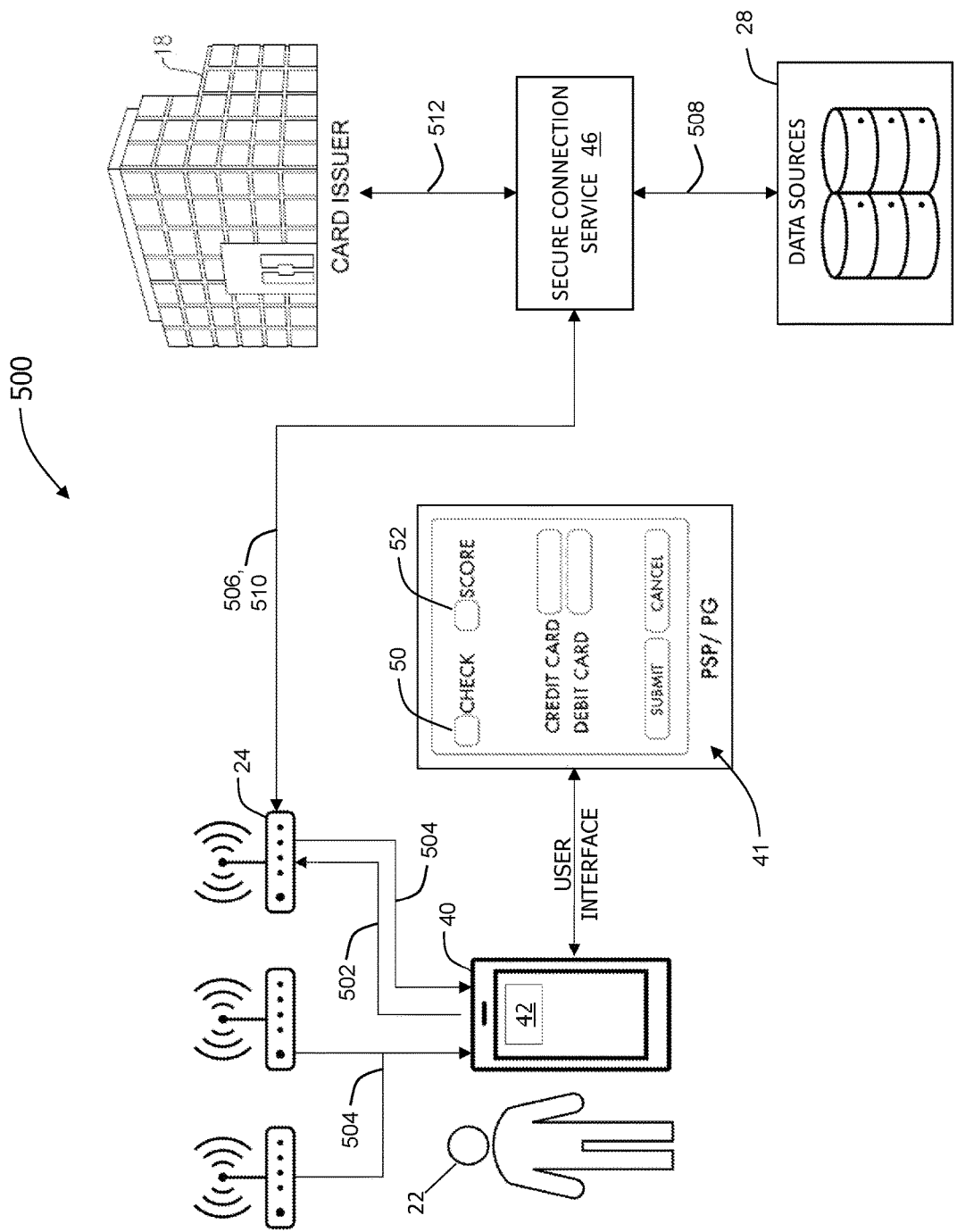
FIG. 5 is a schematic diagram of the payment network system showing a data flow among the parties during a network risk assessment process, in accordance with one embodiment of the present disclosure.

FIG. 5 is a schematic diagram of the payment network system showing a data flow 500 among the parties during a network risk assessment process, in accordance with one embodiment of the present disclosure. The data flow and operations described herein may be performed in the order described herein and depicted in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The data flow 500 and computer-implemented method is described below, for ease of reference, as being executed by exemplary devices and components introduced with the embodiments illustrated in FIGS. 1-4. In one embodiment, the wireless network risk assessment technique is implemented by the secure connection service 46. In the exemplary embodiment, the data flow 500 relates to a payment transaction where the consumer 22 initiates a transaction over an open wireless network, for example, using the mobile device 40 to purchase goods or services associated with a merchant. While operations within the data flow 500 are described below regarding the secure connection service 46, according to some aspects of the present invention, the data flow and computer-implemented methods may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the example embodiment, the consumer 22 connects his or her mobile device, such as the mobile device 40, to an open network router, such as the wireless modem/router 24, as depicted at data flow 502. For example, while checking in to a hotel or motel during a trip, the consumer 22 may use the mobile device 40 to search for or identify free Wi-Fi (i.e., an open network). The consumer 22 may wish, for example, to post pictures to one or more social media accounts, communicate with friends or family, or book further transportation or accommodations for the trip. It is not uncommon for fraudsters to set up open Wi-Fi connections that look like legitimate services offered by a merchant, such as a hotel, coffee shop, etc. The SSID of the fraudulent Wi-Fi connection(s) may look similar to the merchant's name, thereby confusing consumers, such as the consumer 22. When the consumer 22 uploads data to their social media accounts or initiates a transaction online to pay a merchant, the data and card details is at risk of being captured.

To establish a connection to the mobile device 40, the wireless modem/router(s) 24 must transmit various connection-related data, which is depicted at data flow 504. The mobile device 40 can read this data, which is used by the digital wallet application 42 and/or the secure connection service 46 to assess the risk of the network connection(s) provided by the wireless modem/router(s) 24. Furthermore, as depicted in FIG. 5, the mobile device 40 may receive connection-related data from a plurality of wireless modem/router(s). When assessing the Wi-Fi connection established between the mobile device 40 and a connected wireless modem/router 24, the digital wallet application 42 and/or secure connection service 46 can compare the SSIDs, Wi-Fi security parameters, and channel frequencies of all the proximate wireless modem/router(s).

When the consumer 22 selects to initiate a transaction, the digital wallet application 42 presents a CHECK icon 50 and a SCORE icon 52 on the user interface 41 of the mobile device 40. The CHECK icon 50 and a SCORE icon 52 may be presented to the consumer 22 via the digital wallet application 42 or, in some embodiments, may be presented to the user on a checkout screen of payment transaction webpage of a merchant.

When a consumer selects the CHECK icon 50, the digital wallet application 42 transmits the connection-related data to the secure connection service 46, for example, via the Wi-Fi connection established with the wireless modem/router 24, as depicted by data flow 506. In addition, in certain embodiments, the digital wallet application 42 may transmit data associated with the webpage connection of the checkout screen presented on the user interface 41. For example, the digital wallet application 42 may determine whether the webpage connection is a secure connection (e.g., via HTTPS) or an unsecure connection (e.g., via HTTP).

The secure connection service 46 may retrieve one or more social media service logs from the data sources 28 (e.g., data logs associated with Facebook®, Instagram®, Twitter®, etc.) as depicted by data flow 508. The social media service logs are used to check and analyze recent data traffic sent to or from the social media services via the Wi-Fi connection. The social media service logs include, for example, an SSID name, connection security parameter, etc. The secure connection service 46 can use the social media service logs in combination with the connection-related data to provide the connection risk score.

After determining the connection risk score, the secure connection service 46 transmits the score information back to the mobile device 40 for presentation to the consumer 22 on the user interface 41, as depicted by data flow 510. For example, the digital wallet application 42 presents the connection risk score data to the consumer 22 via the SCORE icon 52. The SCORE icon 52 may present the calculated connection risk score as a numerical value, a color-coded visual element, and/or any other visual indicator that enables the digital wallet application 42 to function as described herein. For example, in certain aspects of the presented invention, the SCORE icon 52 may present a color-coded visual element, wherein the depicted icon box is colored with one or more selected colors that indicate the connection risk score (e.g., green (safe), yellow (caution), red (risk—transaction should not be performed)).

At data flow 512, the secure connection service 46 transmits the connection risk score and/or a step-up authentication alert to the issuer, such as the issuer 18, concerning a forthcoming transaction from the mobile device 40 (e.g., via the digital wallet application 42) and/or an online card-not-present (CNP) transaction.

Exemplary Computer-Implemented Methods

Figure 6:
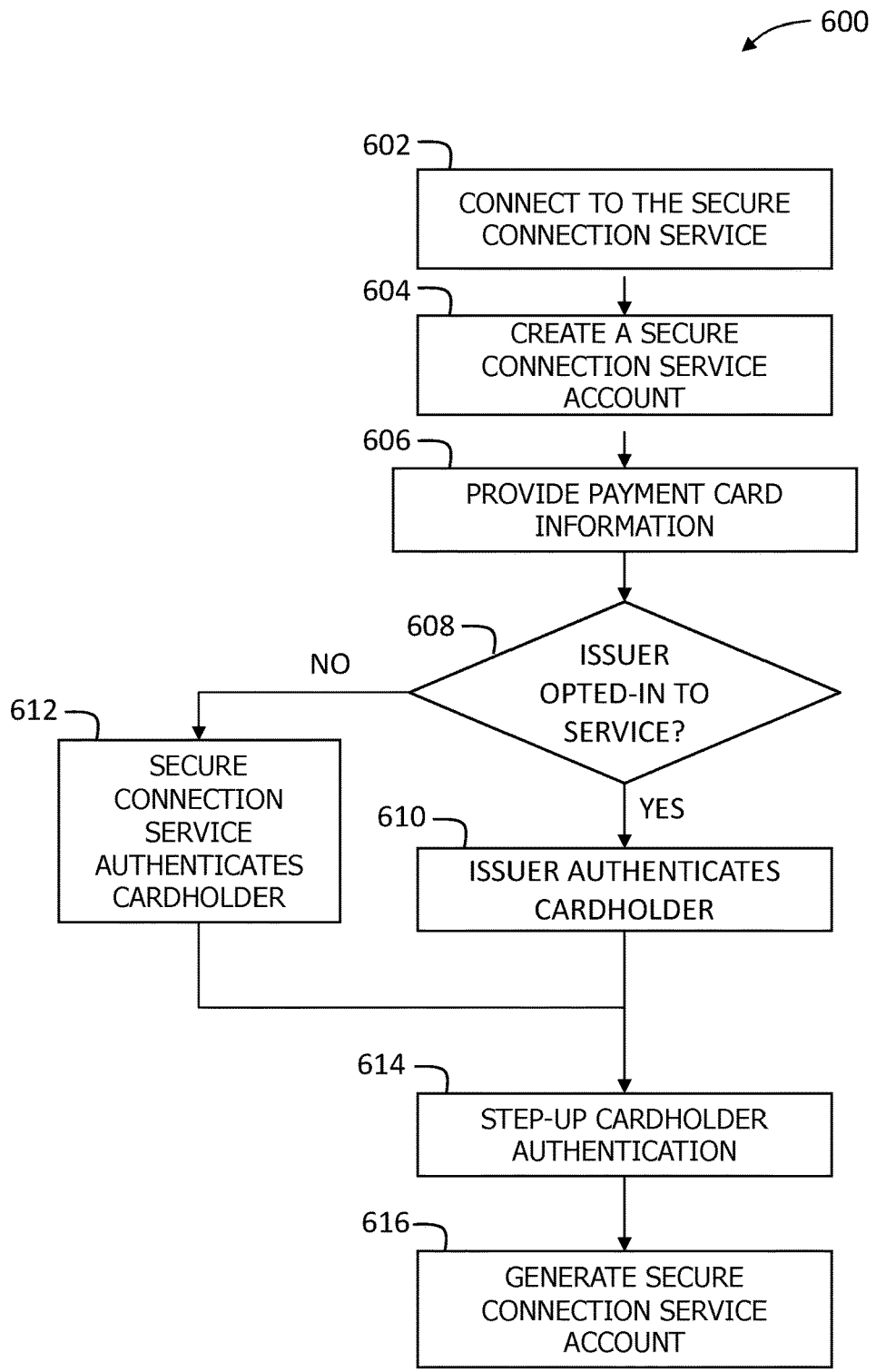
FIG. 6 is a flowchart illustrating an exemplary computer-implemented method for registering a consumer for a secure connection service, in accordance with one embodiment of the present disclosure.

FIG. 6 is a flowchart illustrating an exemplary computer-implemented method 600 for registering a consumer for a secure connection service, in accordance with one embodiment of the present disclosure. The operations described herein may be performed in the order shown in FIG. 6 or may be performed in a different order. Furthermore, some operations may be performed concurrently as opposed to sequentially. In addition, some operations may be optional. The computer-implemented method 600 is described below, for ease of reference, as being executed by exemplary devices and components introduced with the embodiments illustrated in FIGS. 1-5. In one embodiment, the method 600 may be implemented by the secure connection service 46 (shown in FIG. 1). In the exemplary embodiment, the method 600 relates to the receiving of consumer registration information from the consumer 22, for example, via the mobile device 40 (shown in FIG. 1) upon registration for the secure connection service. While operations within the method 600 are described below regarding the mobile device 40, the method 600 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Referring to operation 602, the consumer 22 connects to the secure connection service 46, for example, via a web browser. At operation 604, the consumer 22 is presented with an option to create a secure connection service account. Such enrollment is preferably accomplished through a suitable webpage of the secure connection service 46 using, for example, the mobile device 40. However, in certain example embodiments, enrollment may be accomplished through the digital wallet application 42. It should be understood that the consumer 22 may register with the secure connection service in any of several ways, including utilizing the mobile device 40 to access the secure connection service 46 via the Internet and providing required account information.

During consumer enrollment, the consumer 22 may provide enrollment data including basic information about himself or herself (e.g., name, address, phone number, etc.), and, in some embodiments, provide information regarding the customer's computing devices, such as the mobile device 40 (for example, by providing an electronic identifier and/or a mobile telephone number and/or other device identifier).

Furthermore, the enrollment data may also include consumer consent for the sharing of location and/or device connection-related data of the mobile device 40. There is preferably no sharing of data from the mobile device 40 without the consumer's clear consent.

The consumer 22 may provide information and/or preferences concerning one or more family members, such as a spouse and/or children to form a "Household" virtual device authentication service account. It is noted that the secure connection service account can be linked to other Mastercard services if the consumer 22 is already signed up for other related or unrelated services. In some embodiments, the information obtained from the consumer 22 during the enrollment process includes product and/or service preferences, and/or other information.

At operation 606, the consumer 22 may also provide information concerning his or her payment card, e.g., bank credit card account, debit card account, loyalty card account, and/or gift card issued to or held by him or her. At operation 608, the secure connection service 46 determines whether the issuer 18 of the payment card has opted-in to the secure connection service. If the issuer 18 chooses to opt-in to the secure connection service, at operation 610 the issuer 18 authenticates the consumer 22 in real-time. For example, and without limitation, the issuer 18 may authenticate the consumer 22 via a one-time code sent to the consumer 22 via Short Message Service (SMS), e-mail, through an issuer mobile application, through a call center communication, and the like. In the exemplary embodiment, issuer authentication is the preferred method for authenticating the consumer 22, as the issuer 18 and the consumer 22 have a direct relationship.

If the issuer 18 is not opted-in to the secure connection service and therefore does not participate in the enrollment process, at operation 612, the secure connection service 46 authenticates the consumer 22. For example, and without limitation, the consumer 22 may be asked to input a string of characters indicating a code printed on the signature panel of the consumer's payment card. For example, the signature panel code may be a card verification code (CVC) value. The values entered by the consumer 22 may be used by the secure connection service 46 to authenticate the consumer 22 prior to setting up the secure connection service account and associating the consumer 22 and the consumer's mobile device 40 with the account. For example, the secure connection service 46 compares the entered values to the values associated with the payment card stored in a database (e.g., the transaction database 26 shown in FIG. 1). If the entered values match the stored values, the consumer 22 is authenticated.

Optionally, the method 600 may include an additional operation for authenticating the consumer 22 offline. This may facilitate increasing the confidence level of the consumer's Wi-Fi risk assessment requests received by the secure connection service 46 (particularly if the issuer 18 is not opted-in to the service). For example, and without limitation, the secure connection service 46 may provide an offline PIN to the consumer 22 via mail.

At operation 614, in some embodiments, the secure connection service 46 requests that the consumer 22 set up a step-up authentication method, i.e., two-factor authentication. For example, and without limitation, in one embodiment, the consumer 22 is requested to establish account access credentials, e.g., to select a username and password or PIN (personal identification number) to be used for security purposes, and/or for use by the consumer 22 to login and change one or more preference and/or requirement settings, for example. In addition to the password or PIN, the consumer is requested to set up a second authentication factor, including, for example, and without limitation, providing a biometric sample that is to be associated with the other registration information provided.

Biometric samples include, without limitation, a fingerprint image, a voice recording, a retinal image, facial recognition, palm print image, iris recognition, and the like. The biometric sample is unique to the consumer 22 and difficult to duplicate and/or forge by an unauthorized user. The biometric sample is stored and associated with a biometric identifier, for example, by the secure connection service 46 (e.g., in the transaction database 26, etc.). Additionally, the biometric identifier is associated with the stored registration information and facilitates secure authorization of the consumer 22. A biometric input device in communication with the mobile device 40 may be used for the consumer 22 to enter the biometric sample. For example, the mobile device 40 may include an integral fingerprint or palm reader/scanner, retinal or iris reader/scanner, and/or voice reader/recorder.

In other suitable embodiments, the second factor may include, for example, and without limitation, SMS two-factor authentication (where a one-time use short code is sent to the consumer's mobile device via SMS), Time-Based One Time Password (TOTP) authentication (where an authenticator application provides a short code as a second factor), push-based two-factor authentication (where a prompt is sent to the consumer's mobile device), or any other two-factor authentication method that enables the method 600 to operate as described herein.

At operation 616, the secure connection service 46 generates the secure connection service account for the consumer 22, associating the consumer's one or more payment cards with the account along with the consumer's account access credentials.

Figure 7:
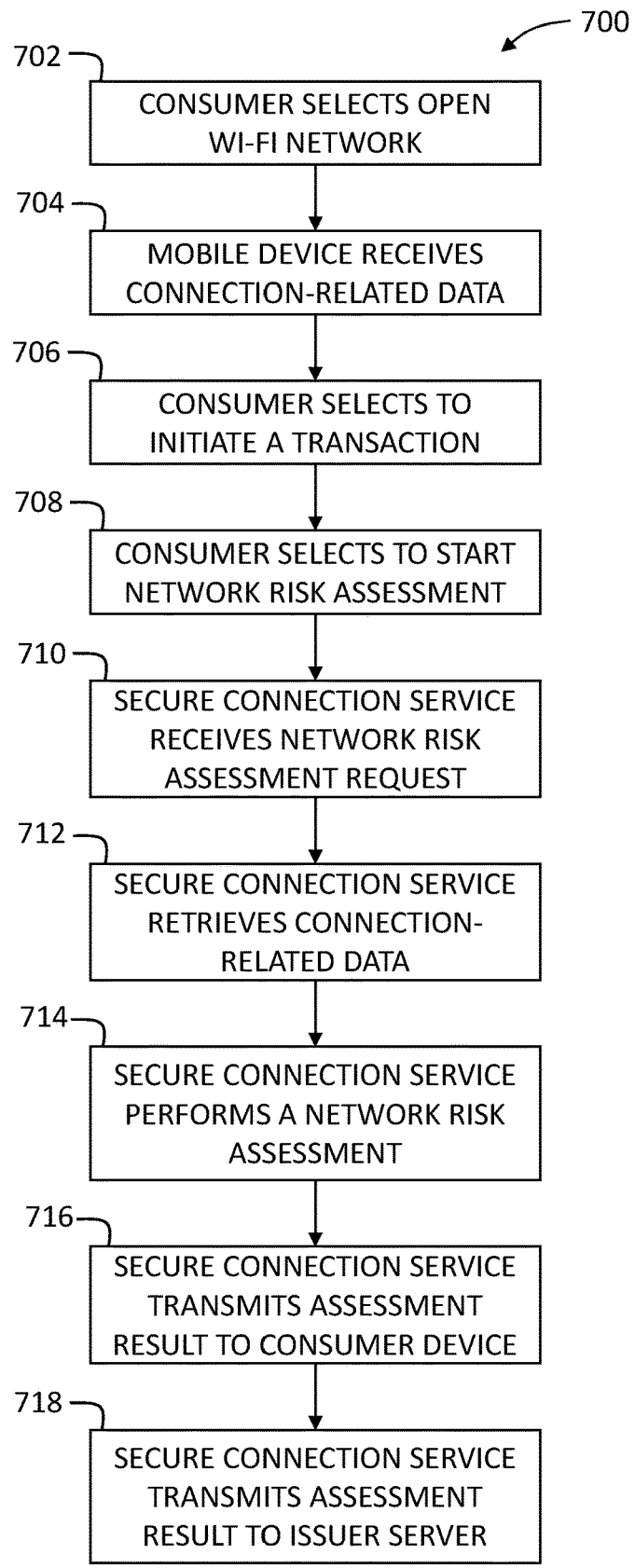
FIG. 7 is a flowchart illustrating an exemplary computer-implemented method for assessing a wireless network risk, in accordance with one embodiment of the present disclosure.

FIG. 7 is a flowchart illustrating an exemplary computer-implemented method 700 for assessing a wireless network risk, in accordance with one embodiment of the present disclosure. The operations described herein also provide the risk assessment to the consumer 22 and provide a connection risk score and step-up authentication alert to an issuer before the transaction is initiated. The operations described herein may be performed in the order shown in FIG. 7 or may be performed in a different order. Furthermore, some operations may be performed concurrently as opposed to sequentially. In addition, some operations may be optional.

The computer-implemented method 700 is described below, for ease of reference, as being executed by exemplary devices and components introduced with the embodiments illustrated in FIGS. 1-5. In one embodiment, the method 700 may be implemented by the secure connection service 46 (shown in FIG. 1). In the exemplary embodiment, the method 700 relates to assessing an open network risk of a consumer's mobile device 40, before the consumer initiates a payment transaction over the open network. While operations within the method 700 are described below regarding a mobile device 40, the method 700 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 702, the consumer 22 selects an open Wi-Fi network (e.g., a public open Wi-Fi network) for connecting to his or her mobile device 40. For example, when checking into a hotel, the consumer 22 may be provided several options for public Wi-Fi connections. Many of the SSIDs of the available Wi-Fi networks (i.e., Wi-Fi networks that are within the broadcast/receiving range of the mobile device 40) look like they are legitimate connections, for example, associated with the hotel (e.g., WestinGuest, Westin_Parking, Westin701, WestinGym1 etc.).

At operation 704, the mobile device 40 receives a plurality of connection-related data from the selected Wi-Fi network and any other available Wi-Fi connections via the mobile device 40. The connection-related data may include, for example, Wi-Fi parameters associated with one or more Wi-Fi networks. The Wi-Fi parameters may include, for example, an SSID of the wireless network(s), a MAC address of the wireless modem/router corresponding to the selected Wi-Fi network, a type of encryption that is supported (if any) for the wireless connection and other Wi-Fi networks, a connection or security key that the network(s) supports (e.g., a Wi-Fi security parameter such as Wireless Equivalent Privacy (WEP), Wi-Fi Protected Access (WPA), WPA2, and WPA3 security standards, etc.), a channel frequency of the Wi-Fi connection (e.g., 2.4 GHz or 5 GHz), etc.

At operation 706, the consumer 22 selects to initiate a payment transaction, for example, via the digital wallet application 42 on the mobile device 40 or via a checkout webpage displayed on the user interface 41 of the mobile device 40. Upon determining that the consumer 22 has selected to initiate a payment transaction, before executing the payment transaction, the secure connection service 46 presents an option to allow the consumer 22 to perform a risk assessment on the connected Wi-Fi network, and more particularly, the network access provided by the connected wireless modem/router 24. Specifically, at operation 708, the digital wallet application 42 and/or the secure connection service 46 presents a CHECK icon 50 to the consumer 22, for example, on a display of the mobile device 40, via the user interface 41. The CHECK icon 50 may be presented in a transaction screen of the digital wallet application 42 or via a checkout or basket webpage displayed on the user interface 41 of the mobile device 40.

At operation 708, the consumer 22 selects the CHECK icon 50 to initiate a Wi-Fi network risk assessment by the secure connection service 46. At operation 710, the secure connection service 46 receives the Wi-Fi network risk assessment request from the mobile device 40 (upon selection of the CHECK icon 50 by the consumer 22). At operation 712, the secure connection service 46 retrieves the connection-related data from the mobile device 40, for example, via the digital wallet application 42. For example, the secure connection service 46 communicates with the digital wallet application 42 and retrieves the connection-related data associated with the wireless network(s) that are available to the mobile device 40.

At operation 714, the secure connection service 46 performs a Wi-Fi risk assessment of the connected Wi-Fi network, via the connected wireless modem/router 24. In particular, the secure connection service 46 generates a connection risk score for the connected Wi-Fi network. At operation 716, the secure connection service 46 transmits a result of the Wi-Fi risk assessment (see FIG. 8 and the discussion below) to the mobile device 40 for presentation to the consumer 22 via the user interface 41. For example, the secure connection service 46 transmits the connection risk score and/or an associated score indicator to the mobile device 40 for presentation to the consumer 22.

In particular, the digital wallet application 42 and/or the secure connection service 46 presents a SCORE icon 52 to the consumer 22, for example, on a display of the mobile device 40, via the user interface 41. The SCORE icon 52 may be presented in a transaction screen of the digital wallet application 42 or via a checkout or basket webpage displayed on the user interface 41 of the mobile device 40. As described herein, the score indicator presented via the SCORE icon 52 may include, for example, a color-coded visual element. The color-coded visual element may include, for example, one or more selected colors that provide a visual indication or are associated with the connection risk score (e.g., green (safe), yellow (caution), red (risk—transaction should not be performed)).

At operation 718, the secure connection service 46 transmits the connection risk score and/or a step-up authentication alert to an issuer server, such as a serv operated by the issuer 18. The connection risk score and/or a step-up authentication alert are related to a (potential) forthcoming transaction from the mobile device 40 (e.g., via the digital wallet application 42) and/or an online card-not-present (CNP) transaction. The risk score and/or a step-up authentication alert may be associated with a predetermined time period. For example, the risk score and/or a step-up authentication alert may be applicable for a period in the range between and including a time transmitted by the secure connection service 46 and a period of about ten (10) minutes after transmission. Consequently, within this period, any transaction authorization request messages received by the issuer associated with a transaction performed by the mobile device 40 may be associated with the received risk score and/or a step-up authentication alert. As such, the issuer may select to authorize the transaction request subject to a step-up authentication procedure between the issuer and the consumer.

Figure 8:
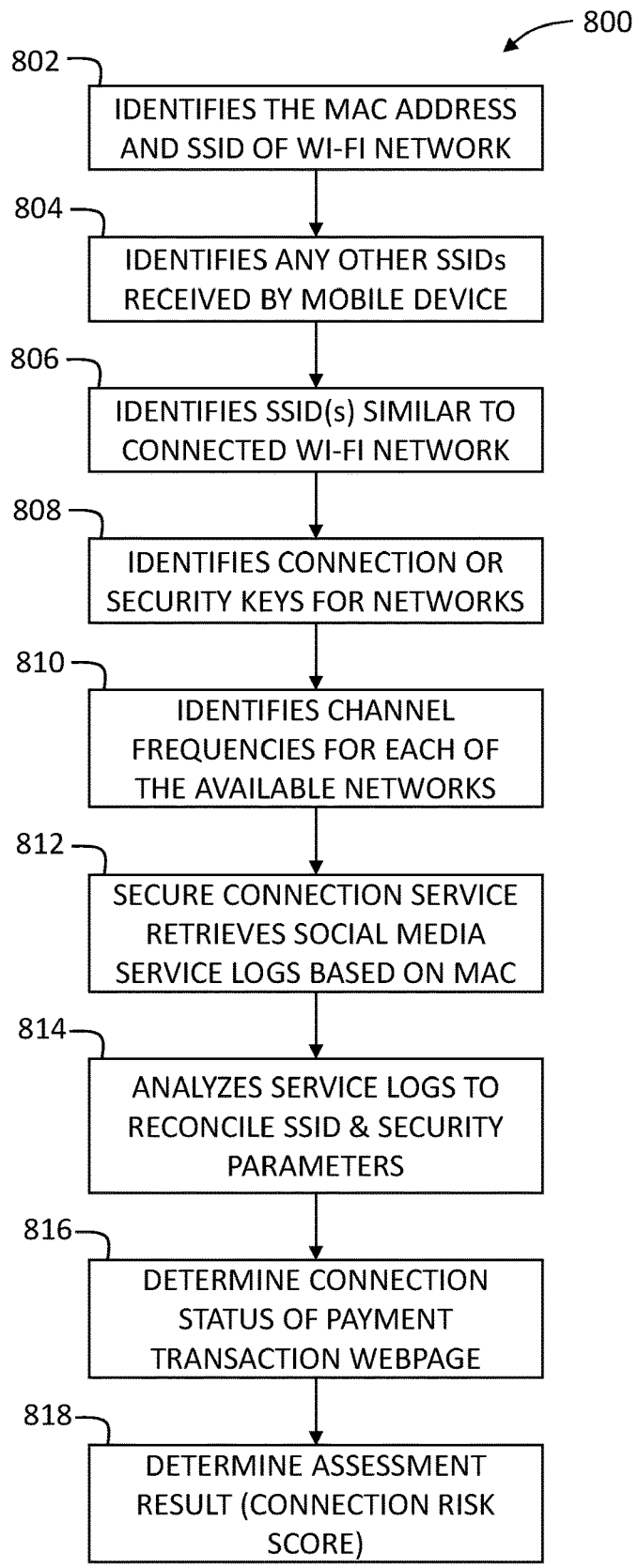
FIG. 8 is a flowchart illustrating an exemplary computer-implemented method for performing a network risk assessment, in accordance with one embodiment of the present disclosure.

FIG. 8 is a flowchart illustrating an exemplary computer-implemented method 800 for performing a network risk assessment, in accordance with one embodiment of the present disclosure. In particular, the method 800 includes the operations performed by the secure connection service 46 to perform operation 712, described above in relation to FIG. 7. The operations described herein may be performed in the order shown in FIG. 8 or may be performed in a different order. Furthermore, some operations may be performed concurrently as opposed to sequentially. In addition, some operations may be optional.

The computer-implemented method 800 is described below, for ease of reference, as being executed by exemplary devices and components introduced with the embodiments illustrated in FIGS. 1-5. In one embodiment, the method 800 may be implemented by the secure connection service 46 (shown in FIG. 1). In the exemplary embodiment, the method 800 relates to generating a connection risk score for an open network connection established with a consumer's mobile device 40, before the consumer initiates a payment transaction over the open network. While operations within the method 800 are described below regarding the secure connection service 46, the method 800 may be implemented on other such computing devices and/or systems through the utilization of processors, transceivers, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 802, from the connection-related data, the secure connection service 46 identifies the MAC address of the connected wireless modem/router 24 and the associated SSID of the connected wireless modem/router 24. Furthermore, at operation 804, the secure connection service 46 identifies the SSIDs of any other available Wi-Fi network connections in the proximate area of the mobile device 40. That is, any Wi-Fi networks or wireless signals that are received by the Wi-Fi component, such as the Wi-Fi component 302, of the mobile device are identified by their respective SSIDs.

At operation 806, the secure connection service 46 identifies any SSIDs that are the same or substantially similar to the SSID of the connected Wi-Fi network. That is, the secure connection service 46 compares the identified SSIDs to one another and uses the comparisons to generate an SSID factor for the connected Wi-Fi network, which may be used for determining the connection risk score. For example, fraudulent networks may broadcast an SSID that is the same or substantially similar to that of a legitimate Wi-Fi network in an attempt to solicit connections from unsuspecting device users. In an example, a legitimate Wi-Fi network for a Westin hotel may have an SSID of "WESTINGUEST," whereas a fraudulent Wi-Fi network may be setup in the same general wireless coverage area and have a similar SSID of "WEST1NGUEST." By replacing the "I" with a "1," a fraudster may be able to solicit network connections from unsuspecting guests of the hotel.

At operation 808, the secure connection service 46 identifies the connection or security keys (a Wi-Fi security parameter) of each of the available Wi-Fi network connections and the connected Wi-Fi network. For example, the secure connection service 46 determines whether each of the available and/or connected Wi-Fi networks are open networks (e.g., requiring no security encryption protocol) or secured networks (e.g., requiring a security key or password for access). As described herein, the connection or security keys may include, for example, a Wi-Fi security parameter such as Wireless Equivalent Privacy (WEP), Wi-Fi Protected Access (WPA), WPA2, and WPA3 security standards, etc. to gain access to the Wi-Fi network. In certain embodiments, there may be separate Wi-Fi networks broadcasting the same SSID, where one requires a Wi-Fi security parameter but the other does not. The security parameter requirement, or lack thereof, may be used to generate a security factor for the connected Wi-Fi network that may be used for determining the connection risk score. For example, Wi-Fi networks protected by a Wi-Fi security parameter may be considered safer than open networks (i.e., less likely to be fraudulent).

At operation 810, the secure connection service 46 identifies the channel frequency of each of the available Wi-Fi network connections and the connected Wi-Fi network. For example, the secure connection service 46 determines whether each of the available and/or connected Wi-Fi networks are operating on one of the standard Wi-Fi frequencies, i.e., 2.4 GHz or 5 GHz or both, and whether there is any channel interference or overlap between the available networks. Some fraudulent networks may broadcast an SSID that is the same or substantially similar to that of a legitimate Wi-Fi network, but where the fraudulent Wi-Fi network operates on a different channel frequency than the legitimate network, in an attempt to solicit connections from unsuspecting device users. Further, some fraudulent networks may overlap with a legitimate Wi-Fi network and capture connections meant for the legitimate network. In other examples, the channel frequency of an SSID may change. The channel frequency data may be used to generate a channel frequency factor for the connected Wi-Fi network that may be used for determining the connection risk score.

At operation 812, the secure connection service 46 retrieves a plurality of social media service logs from the data sources 28. In particular, the secure connection service 46 retrieves the social media service logs that correspond to the identified MAC address of the connected wireless modem/router 24. For example, the secure connection service 46 filters the social media service logs by identifying matches between the MAC address of the connected wireless modem/router 24 and MAC addresses contained in the social media service logs. The social media service logs contain recent data traffic sent from the wireless modem/router 24 and/or reports of fraud on the connections.

At operation 814, the secure connection service 46 analyzes the logs and reconciles additional network parameters like SSID, Wi-Fi security parameter, etc. to identify changes, inconsistencies, etc. between the logs and the connected Wi-Fi network. Further, the secure connection service determines whether any reports of fraud are connected to the connections in the data logs. The social media service logs analysis may be used to generate a social media factor for the connected Wi-Fi network that may be used for determining the connection risk score.

At operation 816, the secure connection service 46 determines whether the Internet or network connection between the mobile device 40 and the checkout screen or basket webpage (i.e., a payment transaction webpage) connection is a secure connection (e.g., via HTTPS) or an unsecure connection (e.g., via HTTP). The connection status of the webpage may be used to generate a connection status factor for the connected Wi-Fi network that may be used as another factor for determining the connection risk score.

At operation 818, the secure connection service 46 calculates a risk assessment result (i.e., the connection risk score). The secure connection service 46 provides connection risk scoring by combining the SSID factor, security factor, channel frequency factor, social media factor, and connection status factor. In some embodiments, the secure connection service 46 may provide connection risk scoring with one or more default scoring rules (e.g., one or more default scoring rules stored in a memory of the secure connection service 46), or may apply issuer-specific settings (e.g., one or more connection risk scoring configuration parameters received from an issuer). The connection risk score is provided to the issuer. In addition, as described above, if the connection risk score exceeds a pre-determined threshold value(s), a step-up authentication alert is transmitted to the issuer. A step-up authentication challenge may be presented to the consumer 22 by the issuer 18 if the consumer selects to continue the transaction.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A system comprising:
a memory device; and
a processor communicatively coupled to the memory device, the memory device storing computer-executable instructions, that when executed by the processor, cause the processor to perform operations comprising:
receiving, from a mobile device of a consumer, a Wi-Fi network risk assessment request, the Wi-Fi network risk assessment request associated with a Wi-Fi network connection of the mobile device;
upon receiving the Wi-Fi network risk assessment request, retrieving a plurality of connection-related data from the mobile device, the connection-related data being associated with the Wi-Fi network connection and one or more other Wi-Fi networks in range of the mobile device;
performing a Wi-Fi risk assessment of the Wi-Fi network connection based on the connection-related data;
transmitting a result of the Wi-Fi risk assessment to the mobile device for presentation via a user interface of the mobile device;
transmitting the result of the Wi-Fi risk assessment to an issuer server, the issuer server being associated with a payment account of the consumer; and
based on the result exceeding a predetermined threshold value, transmitting a step-up authentication alert to the issuer server,
said operation of performing the Wi-Fi risk assessment further comprising:

determining a respective Wi-Fi security parameter for each of the Wi-Fi network connection and the one or more other Wi-Fi networks;
based on the Wi-Fi security parameters, generating a security factor for the Wi-Fi network connection;
determining a respective channel frequency for each of the Wi-Fi network connection and the one or more other Wi-Fi networks; and
based on the respective channel frequencies, generating a channel frequency factor for the Wi-Fi network connection.

2. The system in accordance with claim 1,
the computer-executable instructions, when executed by the processor, further cause the processor to perform operations comprising:
determining that the consumer has selected to initiate a payment transaction via the mobile device; and
before executing the payment transaction, presenting an option to the consumer via the user interface of the mobile device, to allow the consumer to initiate the Wi-Fi network risk assessment request.

3. The system in accordance with claim 1, wherein performing the Wi-Fi risk assessment of the Wi-Fi network connection comprises generating a connection risk score for the Wi-Fi network connection, the connection risk score being based on the connection-related data.

4. The system in accordance with claim 1,
the computer-executable instructions, when executed by the processor, further cause the processor to perform an operation comprising presenting a SCORE icon via the user interface of the mobile device,
the SCORE icon being presented in one or more of the following: a transaction screen of a digital wallet application executing on the mobile device or via a payment transaction webpage displayed on the user interface of the mobile device,
the result of the Wi-Fi risk assessment being presented via the SCORE icon as a color-coded visual element,
the color-coded visual element including one or more selected colors that provide a visual indication of the result of the Wi-Fi risk assessment.

5. The system in accordance with claim 1,
said operation of performing the Wi-Fi risk assessment further comprising:
identifying a MAC address of a wireless modem/router associated with the Wi-Fi network connection of the mobile device;
identifying an SSID associated with the Wi-Fi network connection;
retrieving a plurality of social media service logs from one or more data sources;
filtering the plurality of social media service logs by the MAC address of the wireless modem/router;
analyzing the logs based on SSID, Wi-Fi security parameter, and channel frequency to identify one or more changes and inconsistencies between the plurality of social media service logs and the Wi-Fi network connection; and
generating a social media factor for the Wi-Fi network connection.

6. The system in accordance with claim 5,
said operation of performing the Wi-Fi risk assessment further comprising:
determining whether a network connection between the mobile device and a transaction screen of a digital wallet application executing on the mobile device or a payment transaction webpage displayed on the user interface of the mobile device is a secure connection or an unsecure connection; and
generating a connection status factor for the Wi-Fi network connection.

7. The system in accordance with claim 6,
said operation of performing the Wi-Fi risk assessment further comprising:
combining the SSID factor, the security factor, the channel frequency factor, the social media factor, and the connection status factor based on one or more default scoring rules; and
generating a connection risk score based on the combining, the connection risk score being indicative of the result of the Wi-Fi risk assessment.

8. A method comprising:
receiving, from a mobile device of a consumer, a Wi-Fi network risk assessment request, the Wi-Fi network risk assessment request associated with a Wi-Fi network connection of the mobile device;
upon receiving the Wi-Fi network risk assessment request, retrieving a plurality of connection-related data from the mobile device, the connection-related data being associated with the Wi-Fi network connection;
performing a Wi-Fi risk assessment of the Wi-Fi network connection based on the connection-related data;
transmitting a result of the Wi-Fi risk assessment to the mobile device for presentation via a user interface of the mobile device;
transmitting the result of the Wi-Fi risk assessment to an issuer server, the issuer server being associated with a payment account of the consumer; and
based on the result exceeding a predetermined threshold value, transmitting a step-up authentication alert to the issuer server,
wherein said operation of performing the Wi-Fi risk assessment further comprises:
determining a respective Wi-Fi security parameter for each of the Wi-Fi network connection and the one or more other Wi-Fi networks;
based on the Wi-Fi security parameters, generating a security factor for the Wi-Fi network connection;
determining a respective channel frequency for each of the Wi-Fi network connection and the one or more other Wi-Fi networks; and
based on the respective channel frequencies, generating a channel frequency factor for the Wi-Fi network connection.

9. The method in accordance with claim 8, further comprising:
determining that the consumer has selected to initiate a payment transaction via the mobile device; and
before executing the payment transaction, presenting an option to the consumer via the user interface of the mobile device, to allow the consumer to initiate the Wi-Fi network risk assessment request.

10. The method in accordance with claim 8, wherein performing the Wi-Fi risk assessment of the Wi-Fi network connection comprises generating a connection risk score for the Wi-Fi network connection, the connection risk score being based on the connection-related data.

11. The method in accordance with claim 8, further comprising presenting a SCORE icon via the user interface of the mobile device,
the SCORE icon being presented in one or more of the following: a transaction screen of a digital wallet application executing on the mobile device or via a payment transaction webpage displayed on the user interface of the mobile device, the result of the Wi-Fi risk assessment being presented via the SCORE icon as a color-coded visual element, the color-coded visual element including one or more selected colors that provide a visual indication of the result of the Wi-Fi risk assessment.

12. The method in accordance with claim 8, wherein said operation of performing the Wi-Fi risk assessment further comprises:

identifying a MAC address of a wireless modem/router associated with the Wi-Fi network connection of the mobile device;

identifying an SSID associated with the Wi-Fi network connection;

retrieving a plurality of social media service logs from one or more data sources;

filtering the plurality of social media service logs by the MAC address of the wireless modem/router;

analyzing the logs based on SSID, Wi-Fi security parameter, and channel frequency to identify one or more changes and inconsistencies between the plurality of social media service logs and the Wi-Fi network connection; and generating a social media factor for the Wi-Fi network connection.

13. The method in accordance with claim 12, wherein said operation of performing the Wi-Fi risk assessment further comprises:

determining whether a network connection between the mobile device and a transaction screen of a digital wallet application executing on the mobile device or a payment transaction webpage displayed on the user interface of the mobile device is a secure connection or an unsecure connection; and generating a connection status factor for the Wi-Fi network connection.

14. The method in accordance with claim 13, said operation of performing the Wi-Fi risk assessment further comprises:

combining the SSID factor, the security factor, the channel frequency factor, the social media factor, and the connection status factor based on one or more default scoring rules; and generating a connection risk score based on the combining, the connection risk score being indicative of the result of the Wi-Fi risk assessment.

15. A non-transitory computer-readable storage media having computer-executable instructions stored thereon, wherein when executed by one or more processors, the computer-executable instructions cause the one or more processors to:

receive, from a mobile device of a consumer, a Wi-Fi network risk assessment request, the Wi-Fi network risk assessment request associated with a Wi-Fi network connection of the mobile device;

upon receiving the Wi-Fi network risk assessment request, retrieve a plurality of connection-related data from the mobile device, the connection-related data being associated with the Wi-Fi network connection;

perform a Wi-Fi risk assessment of the Wi-Fi network connection based on the connection-related data;

transmit a result of the Wi-Fi risk assessment to the mobile device for presentation via a user interface of the mobile device;

transmit the result of the Wi-Fi risk assessment to an issuer server, the issuer server being associated with a payment account of the consumer;

based on the result exceeding a predetermined threshold value, transmit a step-up authentication alert to the issuer server;

determine a respective Wi-Fi security parameter for each of the Wi-Fi network connection and the one or more other Wi-Fi networks;

based on the Wi-Fi security parameters, generate a security factor for the Wi-Fi network connection;

determine a respective channel frequency for each of the Wi-Fi network connection and the one or more other Wi-Fi networks;

based on the respective channel frequencies, generate a channel frequency factor for the Wi-Fi network connection;

identify a MAC address of a wireless modem/router associated with the Wi-Fi network connection of the mobile device;

identify an SSID associated with the Wi-Fi network connection;

retrieve a plurality of social media service logs from one or more data sources;

filter the plurality of social media service logs by the MAC address of the wireless modem/router;

analyze the logs based on SSID, Wi-Fi security parameter, and channel frequency to identify one or more changes and inconsistencies between the plurality of social media service logs and the Wi-Fi network connection; and generate a social media factor for the Wi-Fi network connection.

16. The non-transitory computer-readable storage media of claim 15, wherein when executed by the one or more processors, the computer-executable instructions further cause the one or more processors to:

determine that the consumer has selected to initiate a payment transaction via the mobile device; and before executing the payment transaction, present an option to the consumer via the user interface of the mobile device, to allow the consumer to initiate the Wi-Fi network risk assessment request.

17. The non-transitory computer-readable storage media of claim 15, wherein performing the Wi-Fi risk assessment of the Wi-Fi network connection comprises generating a connection risk score for the Wi-Fi network connection, the connection risk score being based on the connection-related data.

* * * * *